United States Patent [19]

Coenen et al.

[11] 4,305,917
[45] Dec. 15, 1981

[54] METHOD FOR PREPARING AMMONIA AND HYDROGEN CHLORIDE FROM AMMONIUM CHLORIDE

[75] Inventors: Alfred Coenen, Maria Laach; Kurt Kosswig; Dieter Balzer, both of Marl, all of Fed. Rep. of Germany

[73] Assignee: Chemische Werke Hüls AG, Marl, Fed. Rep. of Germany

[21] Appl. No.: 191,269

[22] Filed: Sep. 26, 1980

[30] Foreign Application Priority Data

Oct. 6, 1979 [DE] Fed. Rep. of Germany ....... 2940555

[51] Int. Cl.$^3$ .............................................. C01C 1/02
[52] U.S. Cl. .................................... 423/356; 423/481
[58] Field of Search .............................. 423/356, 481

[56] References Cited

U.S. PATENT DOCUMENTS

| 2,823,981 | 2/1958 | Fuchsman | 423/356 |
| 3,443,889 | 5/1969 | Clifford | 423/309 |
| 3,525,590 | 8/1970 | Botton et al. | 423/356 |
| 4,115,530 | 9/1978 | Coenen et al. | 423/488 |
| 4,230,681 | 10/1980 | Coenen et al. | 423/481 |

FOREIGN PATENT DOCUMENTS

| 33552 | 9/1968 | Israel. | |
| 743295 | 1/1956 | United Kingdom | 423/356 |
| 1541538 | 3/1979 | United Kingdom. | |

OTHER PUBLICATIONS

Kirk–Othmer, Encyclopedia of Chemical Technology, vol. 2, (1963), pp. 316–319.

Primary Examiner—O. R. Vertiz
Assistant Examiner—Wayne A. Langel
Attorney, Agent, or Firm—Wells & Wells

[57] ABSTRACT

According to the present invention, ammonia and hydrogen chloride are prepared from ammonium chloride. The steps of the process include:
1. heating a mixture consisting essentially of
   (a) ammonium chloride,
   (b) a water-insoluble amine, and
   (c) an organic solvent;
2. evacuating the ammonia released thereby;
3. removing the polar solvent and any water remaining in the sump to the extent possible and/or required; and
4. heating the residue containing a non-polar and/or a weakly polar solvent and removing the hydrogen chloride.

7 Claims, 1 Drawing Figure

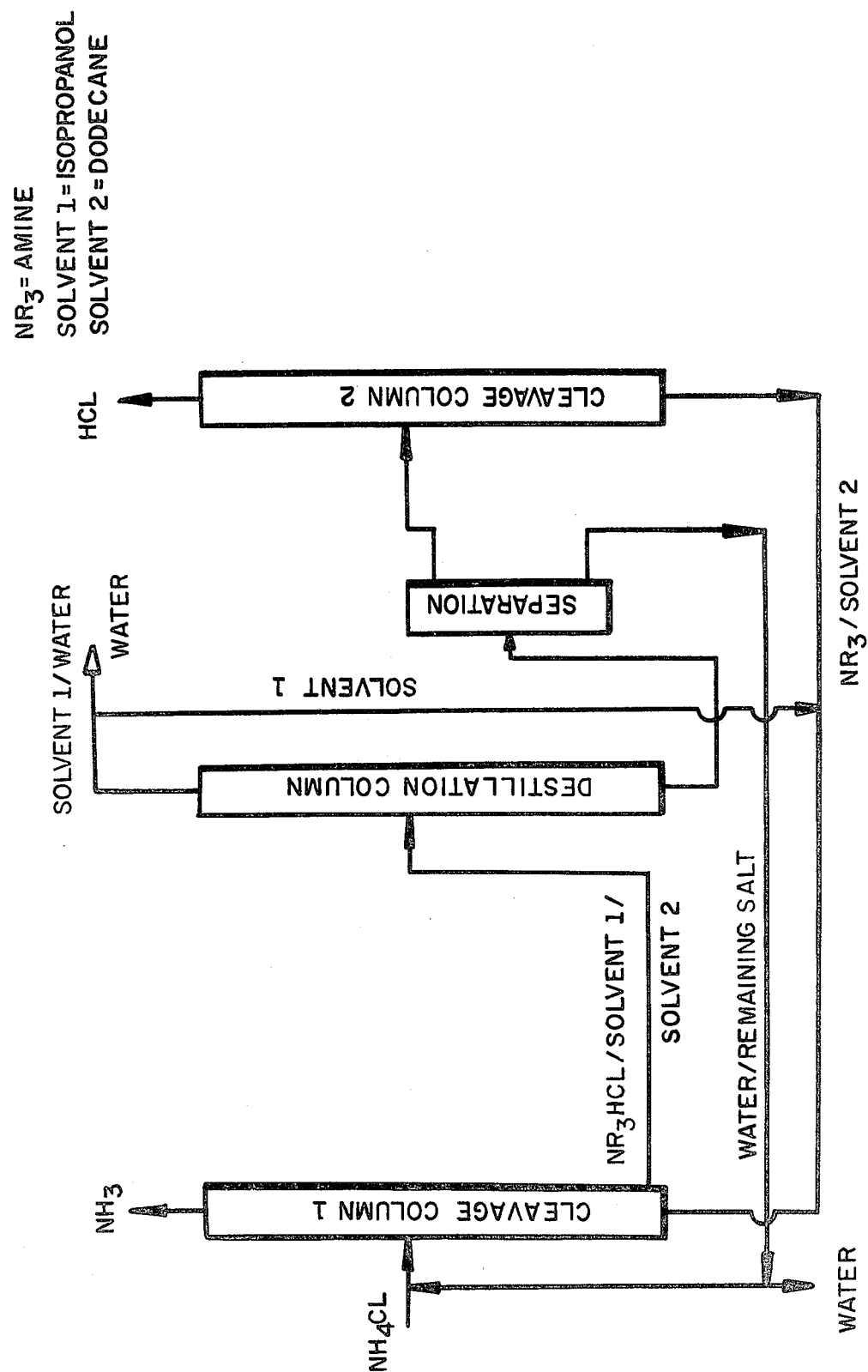

METHOD FOR PREPARING AMMONIA AND HYDROGEN CHLORIDE FROM AMMONIUM CHLORIDE

CROSS REFERENCE TO RELATED APPLICATIONS

Applicants claim priority under 35 USC 119 for application P 29 40 555.8, filed Oct. 6, 1979 in the Patent Office of the Federal Republic of Germany.

The disclosures of Assignee's copending U.S. patent applications Ser. Nos. 10,048; 64,633 and 152,525, filed Feb. 6, 1979; Aug. 9, 1979 and May 22, 1980, respectively, are incorporated herein to amplify individual process steps used in the present invention.

BACKGROUND OF THE INVENTION

The field of the invention is the preparation of ammonia and hydrogen chloride from ammonium chloride.

Ammonium chloride is obtained as a byproduct in a series of industrial processes, mostly as an aqueous solution. This applies for instance to the Solvay process for making sodium carbonate, to the preparation of phosphoric acid by the process of British Pat. No. 1 541 538 and for all other methods in which hydrochloric acid is neutralized with ammonia or ammonia with hydrochloric acid.

The state of the art of making ammonium chloride may be ascertained by reference to the Kirk-Othmer, Encyclopedia of Chemical Technology, 2nd Edition, Vol. 2 (1963), pp. 316–319 under the section entitled "Ammonium Chloride"; U.S. Pat. No. 3,443,889; British Pat. No. 1,541,538; and Israeli Pat. No. 33,552, the disclosures of which are incorporated herein.

The disclosure of U.S. Pat. No. 4,115,530 is also incorporated herein to amplify one of the steps of the present invention.

According to the state of the art, ammonium chloride is prepared as the substance itself, or it is treated with a suitable alkalinically reacting material such as sodium carbonate liquor or lime solution for the purpose of recovering the ammonia. Now there is little application for ammonium chloride, since it has only little significance as a fertilizer, and the reaction with for instance NaOH or Ca(OH)$_2$ results in losing both the alkali or earth-alkali ion and the chloride ion, since the chlorides produced in addition to the ammonia as a rule are not utilized, rather they are fed as waste liquors to the sewer and therefore cause substantial ecological damage.

SUMMARY OF THE INVENTION

Having in mind the limitations of the prior art, it is an object of the present invention to develop a process allowing the processing of ammonium chloride in simple and economical manner, so that neither the valuable chlorine is lost nor the environment is damaged by large amounts of sodium or calcium chlorides.

This object is achieved according to the present invention wherein ammonia and hydrogen chloride are prepared from ammonium chloride by 1. heating a mixture at a temperature of about 40° to 250° C. which essentially contains:
(a) about 3 to 20% by weight ammonium chloride,
(b) about 5 to 70% by weight water insoluble amine, and
(c) about 5 to 70% by weight organic solvent;
2. evacuating the ammonia released thereby;
3. removing the polar solvent and any water remaining in the sump to the extent possible and/or required; and
4. heating the residue containing a non-polar and/or a weakly polar solvent at a temperature of about 100° to 250° C. and removing the hydrogen chloride.

BRIEF DESCRIPTION OF THE DRAWING

The drawing appended hereto is a flow sheet showing the steps of the process and the apparatus used particularly in Example 3 of the present invention.

DESCRIPTION OF THE PREFERRED EMBODIMENTS

Basic to the process of the present invention is the mixture in process stage 1 which contains essentially ammonium chloride, a water insoluble amine, an organic solvent and possibly water. Further possible ingredients are for instance certain amount of other salts, and active and inactive decomposition products from the amines that are being used.

Those amines which are useful singly or as mixtures under the reaction conditions of process stage 1 have a maximum water solubility of 5%, preferably 1% and which both form hydrochlorides in process stage 1 and split off in the thermolysis stage (process stage 4) hydrogen chloride as completely as possible and at a sufficiently fast rate, no excessive temperature (beyond 300° C.) being admissible in order to avoid amine decomposition. It is found that these requirements are met by tertiary alkylamines, tertiary aryldialkylamines, secondary arylalkylamines and primary alkylarylamines, which comprise from 14 to 39 C atoms in the nitrogen bound groups, one of the aliphatic nitrogen bound side chains being required to include at least 6 C atoms, and where the nitrogen of the tertiary alkyl amines and aryldialkylamines have no more than one methyl group.

Suitable amines are for instance trihexylamine, triheptylamine, trioctylamine, cyclohexyl-diisooctylamine, tri-(3,5,5-trimethylhexyl)-amine, didecyl-ethylamine, tri-2-ethylhexylamine, di-2-ethylhexylmethylamine, tri-dodecylamine, di-dodecylmethylamine, dodecyl-diisopropylamine, dodecyldibutylamine, dodecyl-diisobutylamine, dodecylisobutyl-methylamine, diisopentadecyl-methylamine, diisopentadecyl-ethylamine, diisopentadecylisopropylamine; p-octyl-aniline, N-octyl-aniline, N-2-ethylhexyl-aniline, N-lauryl-aniline, N,N-dihexylaniline, N,N-di-2-ethylhexyl-aniline, N-iso-tridecyl-aniline, N-isopentadecyl-aniline, N,N-dioctyl-aniline, N,N-didodecyl-aniline, N-dodecyl-N-methyl-aniline, N-dodecyl-N-ethyl-aniline, N-dodecyl-N-hexyl-aniline, N,N-dihexyl-p-toluidine, N,N-diethylbutyl-p-toluidine and N,N-diheptyl-p-toluidine.

It is feasible to make use of other amines than those disclosed above in combination with selected organic solvents or mixtures of solvents in the process of the present invention. The above amines therefore should be viewed as typical, but neither as optimal nor limiting.

Polar solvents are used preferredly in the process of the invention in process stage 1, that is, those characterized by a dipole moment greater than zero as defined in Landolt-Boernstein, PHYSIKALISCHE-CEHMISCHE TABELLEN, 5th ed., 2nd supplementary vol., (1931), pp. 74–76. Especially preferred are polar organic solvents with a dipole moment greater than or equal to one. Most of all, however, the polar solvents should exert a positive effect on the formation of amino hydrochlorides. This means, that the preferred polar organic solvent must be adjusted with respect to the amine used and the total procedure so that the amino hydrochloride is formed in sufficient yields in process stage 1. Furthermore, the polar organic solvent is selected so that it can be removed in the further sequence of the process. This removal takes place before the amino hydrochloride is dissociated, in the most simple and economical manner from the organic phase(s), for instance by distillation or extraction and the removal takes place to the extent it is possible and/or desirable.

Suitable organic solvents with a boiling point between about 40° to 250° C. from the most diverse classes of compounds (alcohols, esters, ethers, amides, sulfoxides, ketones, substituted alkanes and substituted aromatics, among others) are, for instance primary, secondary and tertiary alcohols having 1 to 12C atoms, for instance, methanol, ethanol, propanols, butanols, pentanols, 2-ethyl-hexanol, decanol, and cyclohexanol, butylacetate, di-n-butylether, (1,4)-dioxane, tetrahydrofuran, dimethylformamide, dimethylsulfoxide, acetone, nitromethane, nitrobenzene, benzonitrile, phenol and its alkyl nuclear substituted derivatives, and anisole.

Advantageously, mixtures of one or more polar solvents with one or more non-polar solvents are also useful in process stage 1. The non-polar solvents are found to affect the release of ammonia only in an insignificant manner. In any event, in the further sequence of the procedure, and at the latest before process stage 4 is carried out, a suitable non-polar or weakly polar solvent ($0 \leq$ dipole moment $\leq 1$) is added, so that it is appropriate to circulate it together with the amine in the entire process. This procedure also includes the use of one and the same weakly polar solvent in process stages 1 and 4.

Suitable non-polar solvents selected from the group of the aromatic, araliphatic and aliphatic hydrocarbons, which as a rule have boiling points above about 140° C., preferably above 170° C., and which under the reaction conditions are inert or substantially inert with respect to water, hydrogen chloride, amines and thermal stresses, are for instance: cymols, 1,2,3-trimethylbenzene, 1,2,4-trimethylbenzene, 1,2,4-triethylbenzene, 1,3,5-triethylbenzene, 1,2,3,4-tetramethylbenzene, 1,2,3,5-tetramethylbenzene, 5-tert.-butyl-m-xylol, 3-phenylpentane, dodecylbenzene, decane, undecane, dodecane, tetradecane, Decalin and Tetralin.

The ammonium chloride is used both in the form of a solid and in an aqueous solution, however, when using an aqueous solution, the water content is kept as low as possible. In both cases, further salts may also be included in such amounts that they do not appreciably affect the implementability and economy of the process. As a rule the ammonium chloride content in process stage 1 at the beginning of the reaction is up to 30, preferably 20 to 3% by weight referred to the mixture of ammonium chloride, water soluble amine and organic solvent.

The molar ratio of ammonium chloride to the amine used is at least 1/1, preferably however, an excess of amine is chosen, that is a molar ratio of 1/n, where $1 < n < 3$.

The weight ratio of the organic solvent, or preferably of the mixture of polar and non-polar organic solvents to the amine is varied in the present process within the limits of about 10/1 to about 0.2/1, preferably from 5/1 to 0.5/1. By means of a few test runs, one can easily ascertain which composition bests fits the particular case.

When a mixture of polar and non-polar solvents is used in the process stage, it is appropriate, however, that there be no excess by weight of the polar solvents over the non-polar solvents.

When implementing the process of the present invention, the procedure as a rule is such that the mixture, which contains essentially ammonium chloride, a water-insoluble amine, an organic solvent or mixture of solvents and possibly water, is heated in a suitable container for some time at temperatures from about 40° to 250° C., preferably 50° to 150° C. Advantageously, the sump temperature corresponds to the boiling point of the organic solvent. At the head of the container, preferably a column, the vapors consisting mostly of the organic solvent are condensed and returned to the sump as reflux, the ammonia not dissolved by the condensed solvent and contained in the vapors being withdrawn from the condensation zone (process stage 2). The discharge of the ammonia is furthermore accelerated by using an inert gas. Suitable inert gases are nitrogen for instance, or other gaseous materials that do not react with ammonia under the prevailing conditions of reaction.

As a rule, the splitting, expulsion and isolation of the ammonia is carried out without gauge pressure. However, it is possible to implement the procedure also at both reduced and gauge pressures.

Next, in process stage 3, the sump materials from the previous process stages are rid as far as possible and/or required of the polar solvent(s) and any water present, for instance by extraction and/or distillation. For instance, an organic polar solvent might have been used alone or in a mixture with another polar organic solvent in the process stage 1 so that it is inert or extensively inert under the conditions of reaction of process stage 4, and therefore remains in the sump. Furthermore, the water need be removed only when gaseous hydrogen chloride is to be obtained in the ensuing amine hydrochloride dissociation.

Before heating the residue from process stage 3 for the purpose of dissociating hydrogen chloride from the aminohydrochloride for the purpose of splitting off hydrogen chloride (process stage 4), care is paid that the required amount of suitable non-polar or weakly polar solvent is added to it, unless already added in process stage 1 or a subsequent step. As a rule, from about 5 to 0.1 parts by weight, preferably 3 to 0.2 parts by weight of non-polar or weakly polar solvent per part by weight of amine (sum of free amine and amine bound as hydrochloride) is used.

When implementing the thermal dissociation of the aminohydrochloride, the procedures disclosed in U.S. Pat. No. 4,115,530 or in U.S. patent application Ser. No. 10,048 are useful. In the process of U.S. Pat. No. 4,115,530, the solution of the aminohydrochloride which may still contain free amine is boiled in a container provided with a column, where the solvent boils at 20° C. or more below the boiling point of the amine. The vapors consiting mostly of the solvent are condensed at the head of the column and are returned to the column as reflux, the hydrogen chloride not dissolved by the solvent and contained in the vapors escapes at the same time from the condensation zone. The hydrogen chloride split off can be expanded beyond the condenser to a lesser pressure or be discharged by means of a flow of inert gas in order to accelerate the formation of hydrogen chloride. Nitrogen is an appropriate inert gas, also those substances which are gaseous under the prevailing conditions, for instance, ethylene, which will react with hydrogen chloride in an ensuing stage.

In the process of U.S. patent application Ser. No. 10,048, the hydrogen chloride is extracted from the aminohydrochloride where the aminohydrochloride is heated to 100° to 250° C. in the non-polar solvent while a flow of inert gas is passed through. The advantageous temperature within this temperature range depends both on the kind and the amount of amine and on the non-polar solvent. Advantageously, the non-polar solvent exhibits a relatively low vapor pressure at the dissociation temperature, that is, its boiling point should be at least 20° C. above the temperature of dissociation, so that the discharge as vapor in the flow of inert gas is kept as low as possible.

The hydrogen chloride can be prepared from the mixture of inert gas and hydrogen chloride in pure form, for instance by adsorption, however, this is not required in all cases, depending on the application. If, for instance, the carrier gas used is ethylene, the mixture of gases so obtained is used directly in the synthesis of chloroethanes.

In a preferred embodiment of the present invention, small amounts of contaminants such as primary and secondary amines generated most of all by thermally stressing the tertiary amine and the non-polar solvent are removed from the sump of process stage 4 before its materials are reintroduced again into the process at a suitable site.

The separation of the undesired impurities is carried out for example, as disclosed in U.S. patent application Ser. Nos. 64,633 and 152,525. In the case of U.S. patent application Ser. No. 64,633, the mixture of amine, solvent and possibly contaminants is passed in part or in whole over an adsorbent such as aluminum oxide, silica gel or silanized silica gel. In the process of U.S. patent application Ser. No. 152,525, the primary and secondary amines formed on the other hand are inactivated by being reacted with carboxylic acid chlorides.

The process of the present invention can be carried out both continuously and discontinuously.

The ammonia obtained in the process of the present invention can be used either in gaseous or condensed form, for instance, to prepare amines, and the side product of hydrogen chloride for instance can be used to manufacture hydrochloric acid or chlorinated hydrocarbons such as vinyl chloride.

All percentage data, including those in the examples below, which illustrate the process of the present invention, both in its intermediate steps and in its whole, unless otherwise indicated, are in percent by weight.

EXAMPLE 1

A round flask of 0.5 liter capacity and comprising a 20 cm column and a reflux condenser is loaded with 90 g (0.33 moles) of tri-n-hexylamine; 14.5 g (0.27 moles) of ammonium chloride in 37.5 g of water and 114 g of isopropanol and heated under reflux. The bath temperature is 160° C., and a sump temperature of 82° C. sets in. 10 Liters per hour of nitrogen are fed through a connector at the side into the flask. The nitrogen flowing through the column and the condenser passes through two cascade-mounted washing bottles contain 0.5 normal sulfuric acid as the adsorbing fluid. Titrating with liquor allows the determination of the amount of ammonia produced at any time. Within 6 hours, 0.268 moles of ammonia are bound in the wash bottles, corresponding to a yield of 99.4%.

EXAMPLE 2

115 g (0.323 moles) or tri-n-octylamine; 14.5 g (0.27 moles) of ammonium chloride in 20 g of water and 114 g of isopropanol are placed in the apparatus of Example 1. The mixture is heated under reflux while 10 liters per hour of nitrogen are passed through. A sump temperature of 82° C. sets in for a bath temperature of 160° C. After 5½ hours, 0.255 moles of ammonia are adsorbed in the wash bottles. This is a conversion of 94.4%.

150 g of dodecane are added to 225 g of the reaction product, the isopropanol and part of the water being distilled off in a distillation column. There is left a residue of 263.5 g with a 3.4% content in ionic chlorine.

Apparatus consisting of a 0.5 liter round flask equipped with a 20 cm Vigreux column simultaneously connected by a water separator to a reflux condenser and a drip funnel are used to dissociate the aminohydrochloride into amine and hydrogen chloride. 10 Liters per hour of nitrogen are fed into the flask by means of a sideways connecting neck. The nitrogen is passed through the column, the condenser and two cascade-arranged wash bottles containing 0.5 Normal soda liquor for the purpose of binding hydrogen chloride. The amount of the hydrogen chloride produced is ascertained at any time by back titration.

Part of the residue (136.5 g) is dripped on the column heated by boiling dodecane (sump temperature 220° C., oil bath at 280° C.) for the purpose of dissociating the aminohydrochloride. 0.12 Moles of hydrogen chloride are dissociated for a dripping time of 141 minutes; this amount being raised to 0.127 moles with a last-runnings time of 17 minutes. This corresponds to a yield of 97.4%.

EXAMPLE 3

A 1 liter round flask equipped with a 20 cm column joined by a Y-connector to a reflux condenser or a drip funnel is loaded with 114 g (0.323 moles) of tri-n-octylamine; 114 g of isopropanol and 100 g of dodecane and heated at the reflux (bath temperature 190° C., sump temperature 84° C.). Over a period of 470 minutes, 14.5 g (0.27 moles) of ammonium chloride and 7.8 g of sodium chloride dissolved in 56 g of water are taken from the drip funnel and added to the column. The ammonia released is collected in the wash bottles loaded with ½ Normal sulfuric acid that are located behind the reflux condenser. 0.170 Moles of ammonia are released in the 470 minutes, corresponding to a yield of 63%.

Thereupon the residue is fed to distillation apparatus for the purpose of separating the isopropanol. A three-phase system remains at room temperature, and this three phase system is separated. The lower aqueous phase contains the sodium chloride and part of the non-converted ammonium chloride, the middle phase contains predominantly the aminohydrochloride (6.3% Cl−) and about 20% dodecane, and the upper phase contains free amine and dodecane.

The apparatus described in Example 2 is used to dissociate the aminohydrochloride into amine and hydrogen chloride.

Part of the middle phase (54.9 g; 6.3% Cl−) dissolved in 100 g of dodecane is dripped into the column which is heated by boiling dodecane (sump temperature 220° C., oil bath 280° C.) in the flask. 0.107 Moles of hydrogen chloride are dissociated during a drip time of 268 minutes. This corresponds to a yield of 99.3%.

EXAMPLES 4 through 7

Ammonia is produced from ammonium chloride using various amines in these examples. The apparatus of Example 1 in each case is loaded with 0.3 moles of amine; 114 g of solvent and 14.5 g (0.27 moles) of ammonium chloride in 21 g of water and heated at reflux with a nitrogen feed rate of 10 liters per hour. The bath temperature is 160° to 170° C.

The results are listed in Table 1.

EXAMPLES 8 through 16

These examples describe the production of ammonia from ammonium chloride using tri-n-octylamine in the presence of various polar solvents. The apparatus of Example 1 is loaded in each case with 114 g (0.323 moles) of amine; 114 g of solvent and 14.5 g (0.27 moles) of ammonium chloride in water, and heated at reflux while nitrogen is applied at the rate of 10 liters per hour. The oil bath temperature is 150° to 160° C.

The results are listed in Table 2.

TABLE 1

| Example | Amine | Solvent | Released ammonia (%) after 2 hr. | 4 hr. | 6 hr. | Sump Temp. °C. |
| --- | --- | --- | --- | --- | --- | --- |
| 4 | Tridodecylamine | Isopropanol | 68 | 95 | — | 83 |
| 5 | Triisononylamine | Isopropanol | 54 | 73 | 92 | 83 |
| 6 | Tri-2-ethyl-hexyl-amine | Phenol | 61 | 75 | — | 110 |
| 7 | N-n-octylaniline | Dimethylformamide | 15 | 28 | 35 | 123 |

TABLE 2

| Example | Solvent | Amount of Water (g) | Released Ammonia (%) After 1 hr. | 2 hr. | 3 hr. | 4 hr. | 5 hr. | Sump Temp. °C. |
| --- | --- | --- | --- | --- | --- | --- | --- | --- |
| 8 | Isopropanol | 75 | 11 | 19 | 25 | 29 | — | 82 |
| 9 | Isobutanol | 75 | 9 | 19 | 26 | 31 | 35 | 93 |
| 10 | Ethanol | 75 | 10 | 15 | 19 | 23 | 27 | 80 |
| 11 | Dioxane | 21 | 11 | 16 | 21 | 26 | — | 93 |
| 12 | Acetone | 21 | 13 | 20 | 24 | 29 | — | 59 |
| 13 | Dimethylformamide | 21 | 44 | 81 | — | — | — | 124 |
| 14 | Nitromethane | 21 | 30 | 48 | 59 | 73 | — | 90 |
| 15 | Dimethylsulfoxide | 21 | 13 | 22 | 33 | 44 | — | 142 |
| 16 | Ethanol/nitrobenzene | 37.5 | 50 | 67 | 75 | 80 | — | 84 |

We claim:

1. In a method for preparing ammonia and hydrogen chloride from ammonium chloride, the improvement comprising:
   (a) at a temperature of about 40° to 250° C. heating a mixture consisting essentially of
      (1) about 3 to 20% by weight ammonium chloride,
      (2) about 5 to 70% by weight water-insoluble amine, and
      (3) about 5 to 70% by weight organic solvent said organic solvent comprising a mixture of polar and non-polar solvents;
   (b) evacuating the ammonia released from step (a);
   (c) removing polar solvent from (a); and
   (d) heating at a temperature of about 100° to 250° C. the residue of (c) containing non-polar and weakly polar solvents and removing the hydrogen chloride.

2. The method of claim 1, wherein said polar solvent has a dipole moment greater than or equal to one and said non-polar solvent has a dipole moment greater than or equal to zero but less than or equal to one.

3. The method of claim 2, wherein said polar solvent is less than or equal to 50% by weight of said mixture of polar and non-polar solvents.

4. The method of claim 3 wherein said non-polar solvent is about 5–0.1 parts by weight in step (d).

5. The method of claim 1, wherein said ammonium chloride comprises an aqueous solution thereof.

6. The method of claim 1, wherein the decomposition products obtained in step (d) are removed or inactivated therein and the product so treated is recycled to step (a).

7. The method of claim 1. wherein the organic solvent of step (a) has a boiling point of about 40° to 250° C.

* * * * *